United States Patent Office.

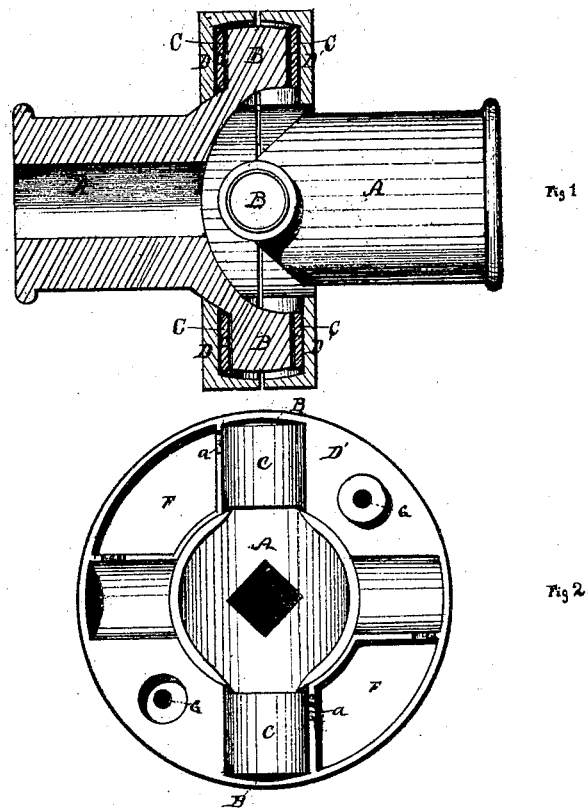

WILLIAM M. PRATT, OF CHICAGO, ILLINOIS.

Letters Patent No. 109,344, dated November 15, 1870.

IMPROVEMENT IN SHAFT-COUPLINGS.

The Schedule referred to in these Letters Patent and making part of the same.

I, WILLIAM M. PRATT, of Chicago, in the county of Cook and State of Illinois, have invented certain Improvements in Safety-Coupling for Tumbling-Rods, of which the following is a specification.

My invention relates to a safety-coupling for tumbling-rods where a universal joint is required, and for other mechanisms requiring a universal joint; and It consists in surrounding the trunnions or journals of the joint by a pair of rings which inclose said trunnions and form a bearing for them, said rings are hollowed out at certain points to form oil-reservoirs for lubricating the bearings. The said rings are firmly bolted together and secure the connection of the joint. And it also more especially consists in providing the trunnions or journals of the joint with friction tubes, washers, or sleeves, as they may be termed, which prevent a rapid wear of the said journals or trunnions.

It has long been considered a desirable object to attain to some construction in universal couplings which shall enable the operator to replace or supply the wear incident to such couplings without the necessity of a new part, as of a trunnion or journal. This I aim to accomplish by my invention. The washers are cheap and readily applied, and take a large share of the wear upon themselves, thus saving the more expensive parts of the coupling.

In the accompanying drawing—

Figure 1 is a vertical section through the center of the coupling, in the direction of its length.

Figure 2 is a view of one-half the coupling detached, exhibiting one of the rings and one of shaft-heads, with its trunnions covered by friction tubes or washers.

General Description.

A A are the shaft-heads.

B B are the trunnions thereof.

C C are the friction-tubes or washers which loosely surround the said trunnions.

D D' are the duplicate rings, supplied each one with the semicircular bearings E E E E, which fit around the trunnions C.

F F are oil-chambers hollowed out of the substance of the rings D D', and are for the purpose of holding oil for lubricating the trunnions by means of a wick extending from said chambers to the bearings.

This wick passes through a small opening, *a*, in the partition between the oil-reservoir and the bearing.

To couple the shaft-heads together I place one in each of the rings D D' so that the trunions B fit into the bearings, and the outer extremity of the shaft-head extends through the central opening of the ring. The two rings are then brought together so that the axes of the trunnions are at right angles, when it will be found that the bearings inclose the said trunnions. The rings are then secured by bolts through the holes G G. These holes are surrounded upon one plate by a projection which fits into a corresponding depression in the other plate; the purpose being to prevent a lateral motion and strain upon the bolts.

I usually make the trunnions of chilled or hardened iron, so that it takes a long time to wear them out where opposed to the soft iron tube or washer C.

These tubes or washers being interposed between the trunnions and their bearings, are constantly turning slightly with the motion of the trunnion, so that a new surface is constantly being presented for the wear.

It will be readily understood that in ordinary couplings of this kind the wear is all upon one side of the trunnion or pivot, as the revolution is never complete. The interposed tube or washer of my invention distributes this wear equally to all points.

Having thus fully described my invention and its operation,

What I claim as new, and desire to secure by Letters Patent, is—

1. The combination of the rings D D', having bearings E, with the shaft-heads A, trunnions B, and tubes or washers C, substantially as and for the purpose specified.

2. The combination of the rings D D', having bearings E, and oil-chambers F, with the shaft-heads A, trunnions B, and tubes or washers C, substantially as specified and shown.

3. The combination of the rings D D', having bearings E, and oil-chambers F, with the shaft heads A and trunnions B, substantially as specified and shown.

4. The oil-chamber or chambers F, in combination with the ring or rings of a tumbling-rod coupler, substantially as specified and shown.

WILLIAM M. PRATT.

Witnesses:
J. W. MUNDAY,
L. L. COBURN.